(12) United States Patent
Gorti et al.

(10) Patent No.: US 11,526,360 B2
(45) Date of Patent: Dec. 13, 2022

(54) ADAPTIVE UTILIZATION MECHANISM FOR A FIRST-LINE DEFENSE BRANCH PREDICTOR

(71) Applicant: International Business Machines Corporation, Armonk, NY (US)

(72) Inventors: Naga P. Gorti, Austin, TX (US); Dave S. Levitan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 16/196,151

(22) Filed: Nov. 20, 2018

(65) Prior Publication Data

US 2020/0159538 A1 May 21, 2020

(51) Int. Cl.
*G06F 9/38* (2018.01)

(52) U.S. Cl.
CPC .......... *G06F 9/3848* (2013.01); *G06F 9/3861* (2013.01)

(58) Field of Classification Search
CPC .. G06F 9/3842; G06F 9/3844; G06F 9/30036; G06F 9/30058; G06F 9/3848; G06F 9/3861
See application file for complete search history.

(56) References Cited

U.S. PATENT DOCUMENTS

| 7,925,853 B2* | 4/2011 | Gschwind | G06F 1/3203 711/163 |
| 7,979,725 B2* | 7/2011 | Atkinson | G06F 1/3225 712/239 |
| 2005/0216714 A1* | 9/2005 | Grochowski | G06F 9/3842 712/240 |
| 2015/0169041 A1* | 6/2015 | Blasco | G06F 9/3806 713/320 |
| 2016/0274914 A1 | 9/2016 | Mizuno et al. | |
| 2018/0069767 A1 | 3/2018 | Basu et al. | |
| 2018/0095762 A1 | 4/2018 | Bonanno et al. | |

OTHER PUBLICATIONS

Definition of "deactivate", Merriam-Webster dictionary, retrieved Mar. 16, 2021, <https://www.merriam-webster.com/dictionary/deactivate> (Year: 2021).*

\* cited by examiner

*Primary Examiner* — Jyoti Mehta
*Assistant Examiner* — Kasim Alli
(74) *Attorney, Agent, or Firm* — Scully, Scott, Murphy & Presser, P.C.

(57) ABSTRACT

A processor comprising a processor pipeline comprising one or more execution units configured to execute branch instructions, a branch predictor associated with the processor pipeline and configured to predict a branch instruction prediction outcome, and the branch prediction unit. The branch predictor is turned off to save power and avoid miss-predictions when the branch predictor and/or branch prediction unit accuracy is lower than expected.

5 Claims, 5 Drawing Sheets

ADAPTIVE UTILIZATION MECHANISM FOR A FIRST-LINE DEFENSE BRANCH PREDICTOR

BACKGROUND

The present invention relates to executions in a processor and more specifically to controlling the accuracy of branch prediction by turning on or off a branch predictor in a processor executing branch instructions.

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction, i.e., several instructions are overlapped in execution. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

Branch instructions (or "branch") can be either unconditional, meaning that the branch is taken every time that the instruction is encountered in the program, or conditional, meaning that the branch is either taken or not taken, depending upon a condition. Processors typically provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. These types of branches can significantly reduce the performance of a pipeline processor since they may interrupt the steady supply of instructions to the execution hardware. Branch predictors attempt to predict the outcome of conditional branch instructions in a program before the branch instruction is executed. If a branch is mispredicted, all of the speculative work, beyond the point in the program where the branch is encountered, must be discarded. Therefore, a highly-accurate branch prediction mechanism is beneficial to a high-performance, pipelined processor where branch prediction may be used to predict the outcome of conditional branch instructions. For example, when a conditional branch instruction is encountered, the processor may predict which instruction will be executed after the outcome of the branch condition is known. Then, instead of stalling the pipeline when the conditional branch instruction is issued, the processor may continue issuing instructions beginning with the predicted next instruction.

Many early implementations of branch predictors used simple history bits and counter-based schemes that provide branch prediction accuracy of about 85-90%. Attempts to improve upon the accuracy of simple 2-bit counter schemes have included predictors that relate the sub-history information of a branch to the most recently executed branches via a shift register. Among the methods used to predict branches are local branch prediction and global branch prediction. Local branch prediction involves making a prediction based on the behavior of a particular branch the past few times it was executed. Local branch prediction is effective for branches exhibiting repetitive patterns. On the other hand, global branch prediction involves making a branch prediction based on the history of the last few branches to have been executed. Global branch prediction is useful when the behavior of a branch is related to the behavior of the prior executed branches.

While history-based dynamic branch predictors have reached high prediction accuracy, certain branch types continue to mispredict. These are branches that may depend on longer history length, have loaded data values or exhibit random behavior (e.g., multi-target indirect branches and data-dependent direct and indirect branches). These are hard-to-predict branches since their outcome do not always exhibit repeatable patterns and trying to predict the outcome of such branches using typical branch predictors result in bottlenecks and low-performance.

A method for improved branch prediction that involves disabling inaccurate branch predictors based on workload and processing cycles of a processor will further improve accuracy of branch prediction and ultimately processor performance.

SUMMARY OF THE INVENTION

The summary of the disclosure is given to aid understanding of the computer processing systems and methods of classifying branch instructions, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

The present invention generally provides improved methods and systems for predicting branch instructions in a processor. In one embodiment, the system is a computing system that includes a memory and a processor. The processor of the computing system includes a processor pipeline comprising one or more execution units configured to execute branch instructions. The system further includes a branch predictor associated with the processor pipeline and configured to determine when to predict branch instruction outcomes of the branch instructions by: for a number of cycles of the processor or for a number of branches, predict a branch instruction outcome for each branch instruction of a plurality of branches; and for each branch instruction of the plurality of branches: increment a counter in response to an actual outcome of the branch instruction condition being the same as the branch prediction outcome of the respective branch instruction; and decrement the counter in response to the actual outcome of the branch instruction condition not being the same as the branch prediction outcome of the respective branch instruction. The branch predictor either activates the branch predictor for a number of cycles of the processor, or de-activates the branch predictor for the number of cycles.

In another embodiment, the method includes detecting, at a processor, a branch instruction. The method further includes determining, at the processor, when to predict branch instruction outcomes of the branch instructions using a branch predictor by: for a number of cycles of the processor or for a number of branches, predict a branch instruction outcome for each branch instruction of a plurality of branch instructions; and for each branch instruction of the plurality of branch instructions: increment a counter in response to an actual outcome of the branch instruction condition being the same as the branch instruction prediction outcome of the respective branch instruction; and decrement the counter in response to the actual outcome of the branch instruction condition not being the same as the branch instruction prediction outcome of the respective branch instruction. The method further includes based on the counter, either activating the branch predictor for a number of cycles of the processor, or de-activating the branch predictor for the number of cycles.

BRIEF DESCRIPTION OF THE DRAWINGS

The various aspects, features and embodiments of processor, architectural structure, and its method of operation will be better understood when read in conjunction with the figures provided. Embodiments are provided in the figures for the purpose of illustrating aspects, features and/or various embodiments of the processor, architectural structure and method of operation, but the claims should not be limited to the precise arrangement, structures, features, aspects, embodiments or devices shown, and the arrangements, structures, subassemblies, features, aspects, embodiments, methods, and devices shown may be used singularly or in combination with other arrangements, structures, subassemblies, features, aspects, embodiments, methods and devices.

DETAILED DESCRIPTION

The following description is made for illustrating the general principles of the invention and is not meant to limit the inventive concepts claimed herein. In the following detailed description, numerous details are set forth in order to provide an understanding of a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features of details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The term "workload" of a processor refers to the number of instructions being executed by the processor during a given period or at a particular instant of time.

Figure 1:
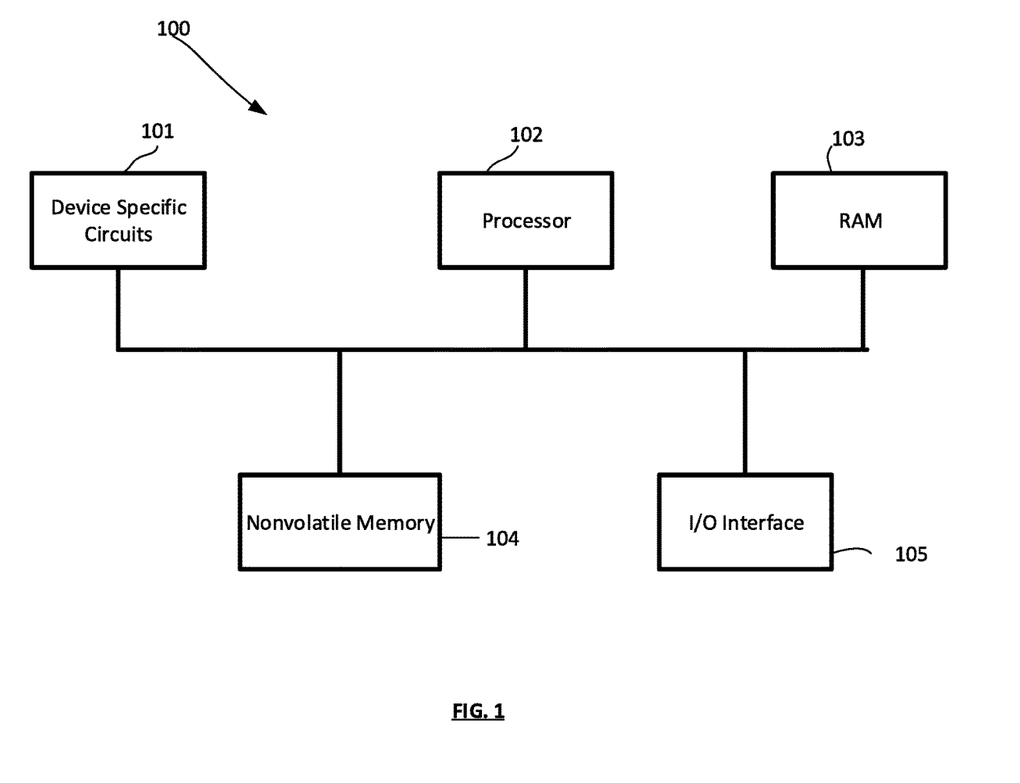
FIG. 1 depicts a general computing or data processing system in accordance with an embodiment.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
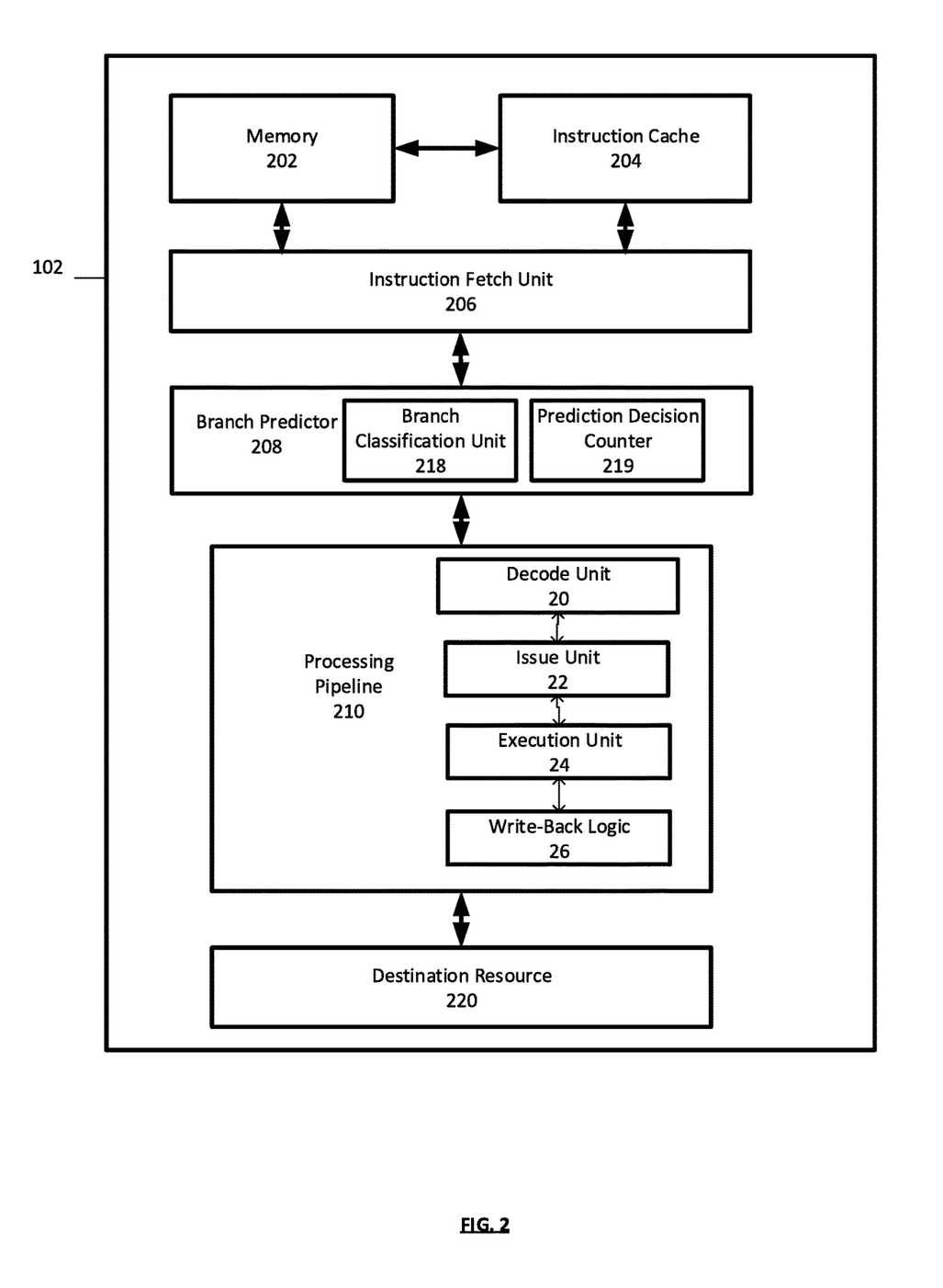
FIG. 2 depicts a block diagram of a processor in accordance with an embodiment.

FIG. 2 depicts a block diagram of a processor 102 according to an embodiment. The processor 102 includes memory 202, instruction cache 204, instruction fetch unit 206, branch predictor 208, branch classification unit 218, and processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. The instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 102. The execution unit 24 may include a plurality of execution units, such as fixed-point execution units, floating-point execution units, load/store execution units, and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

In an embodiment, a variety of suitable branch prediction algorithms may be employed by the branch predictor 208. The branch predictor 208 may include any combination of primary branch prediction structures or circuits, such as a branch target buffer (BTB) or a branch target address cache (BTAC), a branch history table (BHT), one or more pattern history tables (PHT), or the like. The BTB may be set associative and include multiple sets (columns) of BTB entries and each BTB entry may include, for example, a branch address tag and a predicted target address. The BTB may also be direct mapped or fully-associative. The BTB may be a global buffer that records the outcome of every branch that executes, or it may be a per-branch buffer that records only the past history of the same branch. The BHT may hold branch history information that indicates whether a branch is predicted as taken or not taken. The BHT can also include prediction strength indicators for BHT direction predictions (e.g., strong not taken, weak not taken, weak taken, and strong taken). The BHT may be indexed based on an instruction address. A PHT may hold prediction strength indicators for direction predictions and tags associated with branch prediction patterns. To predict a branch in existing branch prediction hardware, the branch instruction's address is combined with the current value of the branch history. This can be a global branch history of the last k branch outcomes (such as a PHT) or a table that has a per-branch history, i.e. the last k outcomes of the same branch (such as a BHT). The resulting value is used to index into a predictor table in order to read off the prediction. After the branch actually executes, the outcome of the branch is shifted into the BTB.

It should be understood that the present disclosure may involve multiple branch prediction structures and their accuracy is usually in tune with their complexity. Aspects of the present disclosure, in one or more embodiments, focus on a fast but inaccurate first-order branch predictor(s).

In an embodiment, the branch predictor 208 also includes a prediction decision counter 219 that increments every time the branch predictor 208 predicts a branch accurately/correctly and decrements every time the branch predictor 208 predicts a branch inaccurately/incorrectly. The prediction decision counter 219 may be implemented as a 256 bit register typically implemented as an 8-bit binary counter and may be initialized at a midpoint value of 128. In one embodiment, each time branch predictor 208 determines that its prediction is correct, the prediction decision counter 219 is incremented. Alternatively, each time branch predictor 208 determines that its prediction is incorrect, the prediction decision counter 219 is decremented. The branch predictor periodically polls this counter to understand it's accuracy. When the prediction decision counter 219 satisfies a threshold when polled then branch predictor's contribution to the branch prediction pipeline 208 may be activated and used to generate branch predictions that are executed by the processor for N number of cycles. This will be referred to as the Use phase for the branch predictor. When the prediction decision counter 219 does not satisfy a threshold when polled, then branch predictor 208 may be de-activated and therefore not used to generate branch predictions for N number of cycles. This will be referred to as the Sleep phase for the branch predictor. In one or more embodiments, any Sleep or Use phase of the predictor is proceeded by a Train phase, where the branch predictor gets updated and makes predictions for the branch instructions in the pipeline. However, the processor will choose to ignore the predictions from the current branch predictor and will rely on alternate branch predictors to issue predictions. In one or more embodiment, every Train phase is proceeded by polling the prediction decision counter 219, which in turn sets the branch predictor into Use or Sleep phase yet again.

In some instances, the branch predictor 208 may execute for a period of time to determine when the branch predictor 208 should be activated and actually used to generate branch predictions (Train phase). In such a scenario, the branch predictor 208 may process a series of instructions received by the fetch unit of the processor and generate branching predictions. These predictions, however, do not drive the processor pipeline. The generated predictions may then be compared to the actual execution performed by the processor to determine whether the prediction of the branch predictor 208 was accurate. In the event the branch predictor 208 was accurate, the branch decision counter 219 is incremented. In the event the branch predictor 208 was inaccurate, the branch decision counter 219 is decremented. Thus, the output of the prediction decision counter 219 can be used to decide whether the branch predictor 208 should be activated or deactivated.

In an embodiment, the branch predictor 208 also includes a branch classification unit 218 (BCU). Alternatively and/or additionally, the BCU 218 may be located separately from the branch predictor 208. In an embodiment, the branch predictor 208 and/or the BCU 218 may be included in the instruction fetch unit and/or the processor pipeline. The BCU 218 is an example of a processing circuit configured to implement branch classification with confidence and usefulness tracking.

Figure 3:
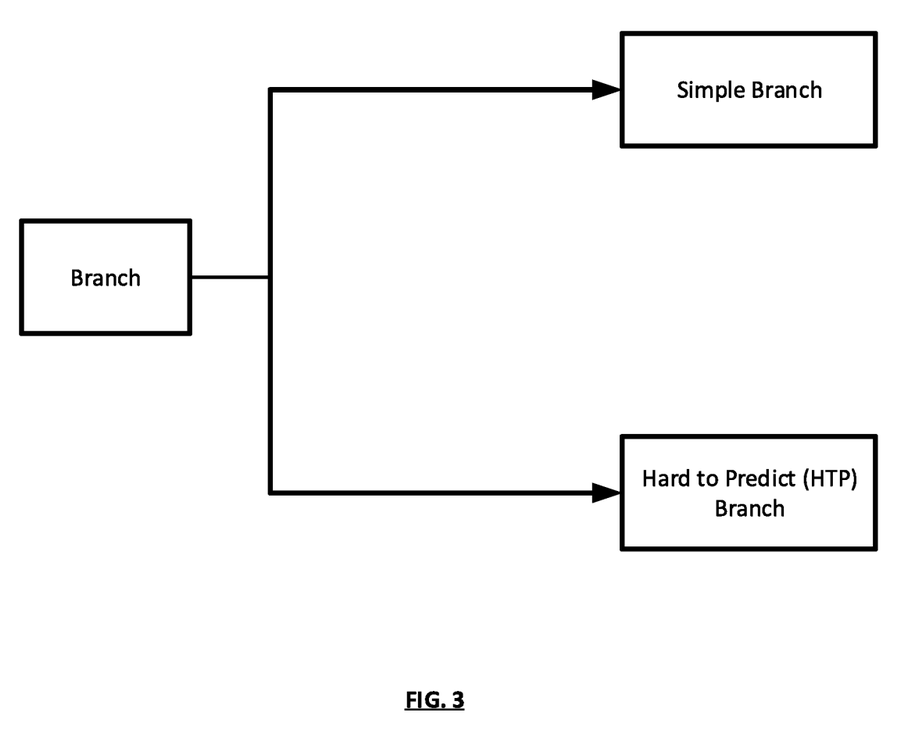
FIG. 3 illustrates branch classes or types used by a branch classification unit in accordance with an embodiment.

In an embodiment, the BCU 218 may apply a set of heuristics to implement branch classification by assigning all incoming branch instructions to one of the branch types illustrated in FIG. 3. Branch classification may partition branches into a set of branch classes statically and/or dynamically by assigning similar behavior to the same class of branches. Furthermore, BCU 218 may dynamically analyze the various processor attributes (such as, for example, the workload, number of instructions per cycles, number of instructions executed per cycle, dispatch to complete ratio, execution unit utilization factors, resources available in the processor, number of instruction streams generated, or the like) in real-time to dynamically determine an accuracy threshold and a stream threshold. The BCU 218 may then perform branch classification by comparing a misprediction accuracy with the dynamically determined threshold accuracy. As such, by analyzing the behavior of a class of branches in conjunction with the real-time processor attributes, branch prediction accuracy for that class may be optimized for a given hardware. For example, prediction accuracy and the number of streams generated may be increased or decreased based on the workload of a processor and/or other processor attributes to maintain desired efficiency of branch execution and performance levels. Specifically, a lowest accuracy rate corresponding to branch classification for a given processor workload may be determined dynamically.

It should be understood that the heuristics described in this disclosure are the result of profiling branches in an industry standard CPU benchmark. Different classes of branches have common characteristics (such as number of branch miss-predictions) that produce the above-listed heuristics. It is appreciated that other embodiments may apply a different set of heuristics. In still other implementations, a subset of the above-listed heuristics may be utilized.

Branch classes or types illustrated in FIG. 3 are classified based on the dynamic branch execution and/or prediction behavior. As shown in FIG. 3, in an embodiment, based on their prediction accuracy, branches may be classified into simple branches and hard-to-predict (HTP) branches. Simple branches are branches whose outcome may be predicted with a high level of accuracy, and HTP branches are branches whose outcome may be predicted with a low level of accuracy. It should be understood that the branch classification unit may be used to classify branch instructions into types or classes that are different and/or a subset of those illustrated in FIG. 3.

Figure 4:
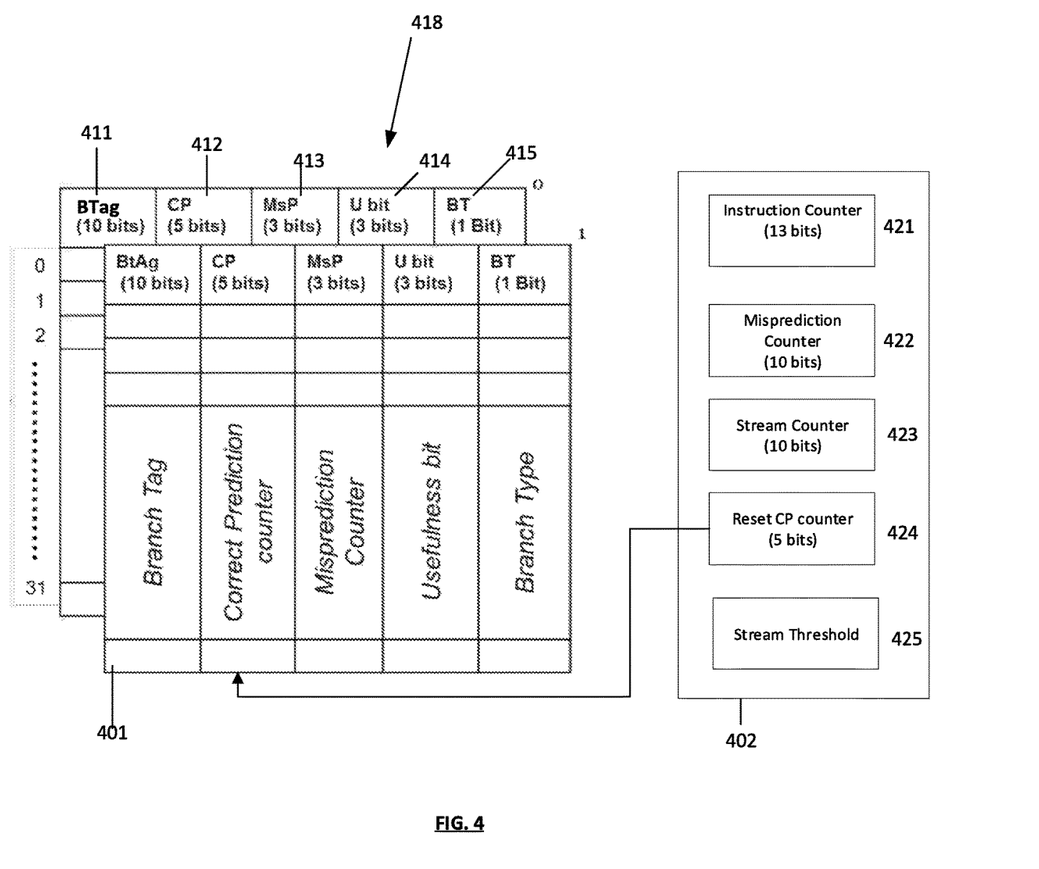
FIG. 4 depicts a branch classification unit in accordance with an embodiment.

FIG. 4 illustrates an example BCU 218 that is used to determine and track the branch type for branch instructions before being forwarded to the branch predictor 208, according to an embodiment. In an embodiment, the BCU 418 includes a branch classification table (BCT) 401 and a threshold determination module 402. As discussed below, the BCT 401 is a statistical table that stores information relating to the actual behavior of selective conditional branch instructions and their predicted behaviors, and may use the information to classify incoming branch instructions. The threshold determination module 402, on the other hand analyzes factors relating to the workload of the processor and/or applications running on the processor in real-time and modifies or influences certain parameters and/or functioning of the BCT 401 (i.e., the correct prediction counter value is modified as discussed below) based on the workload in order to control the accuracy of classification of the BCT. Specifically, since various workloads and/or different applications exhibit different levels of accuracy for identifying HTP branches, the threshold determination module 402 may control the functioning of the BCT 401 such that the lowest accuracy (pre-defined) branches are identified as HTP for all workloads. The threshold determination module dynamically determines the optimal threshold point for different workloads and/or applications of the processor to improve the accuracy of branch classification.

It should also be understood that the outcome of the branch classification may be utilized in various ways to improve performance, without deviating from the principles of this disclosure. For example, an advanced prediction mechanism may be applied to predict the outcome of only those branches which are classified as "hard to predict" by BCU 418.

Alternatively and/or additionally, both the taken path and the not taken path instruction sequences may be issued and executed for all the branches marked as hard to predict (HTP) branches by the BCU 418. The wrong sequence or instruction stream may then be discarded after actual execution of the branch and determining the correct path. In such a case, if, for example, the overall prediction accuracy of the branch prediction for an application and/or workload is 70% (poor branch-prediction overall) and the threshold is fixed to be 80% (or 0.8) irrespective of the workload and/or applications of the processor, then a very high number of branches will be marked as HTP. As a result, a disproportionately high number of instruction streams would be generated (without branch prediction) for all the branches that are classified as HTP leading to reduction in the overall performance. However, the system of the current disclosure may dynamically adjust the threshold value based on the number of instruction streams generated (discussed below), and thus control the number of branches marked as HTP and improve the performance. Similar other uses are within the scope of this disclosure.

As discussed above, to reduce misprediction penalty and/or when a hard to predict branch is encountered, a processor may fetch both instruction streams (taken and not taken) if an HTP branch is encountered. As such, the number of streams generated also needs to be dynamically adjusted based on the processor workload and/or applications in order to improve the processor efficiency. Hence, the threshold determination module 402 also determines the number of streams to be generated based on the processor workload.

Hence, the BCU 418 is configured to identify hard-to-predict branches by taking into account the workload of a processor in real-time to dynamically adjust the accuracy and the stream threshold in order to improve accuracy of branch classification and processor performance.

In an embodiment, BCT 401 may be a 2-way set-associative table of branch classification information, generally organized as a table. In an embodiment, the BCT 401 may include 256 entries, 128 entries, 64 entries, or the like. For example, the BCT 401 shown in FIG. 4 includes 64 entries (0-31 rows in, for example, a 2-way set-associative table). Alternatively, any other desired configuration may be employed such as, for example and without limitation, direct mapped, set-associative, or n-way set associative cache. In an embodiment, the BCT table 401 is written with information about branches executed in pipelines of processor 102 (depicted in FIG. 2) where each entry in BCT 401 represents a branch instruction. In an embodiment, each entry in the BCT 401 has 22 bits (0-21) as discussed below.

The table of BCT 401 may be indexed with instruction virtual address bits that determine the BCT set/row. For example, 5 bits of the instruction address may be extracted after right shifting 6 bits. Additional branch instruction address bits may also be stored within the BCT entry as Btag bits (411). In an embodiment, the Btag 411 may be a tag extracted from the instruction address corresponding to the branch instruction. The Btag may be extracted from the instruction address using methods now or hereafter known to those skilled in the art such as, for example and without limitation, using one or more significant bits, using a xor operation, or the like. In an example embodiment, the Btag may be a 10-bit tag extracted from the instruction address after right shifting 6 bits. Each set/row of the BCT 401 may further include multiple ways/columns. It should be understood that the number of index bits and tag bits will depend on the type of BCT table (fully associative, set-associative, or direct mapped). It will be understood to those skilled in the art that branch classification methods may work without the tag field in the BCT, but it may lead to reduced classification accuracy. The advantage of Btag field is to improve the accuracy and precision of the classification.

As shown in FIG. 4, BCT 401 also includes a correct prediction counter (CP counter) field 412, a misprediction (MsP) field 413, a usefulness bits (U Bit) field 414, and a branch type (BT) field 415. In an embodiment, the CP counter field 412 is a 5-bit field that can have a value of 0-31. The value in the CP counter field is periodically assigned based on the workload of the processor (discussed above). Furthermore, the accuracy of classification performed by BCT (i.e., the accuracy of identifying HTP branches) is dependent upon the value of the CP counter field. Initially, when a new entry for a branch is created in the BCT 401, the CP counter field is assigned a value determined by the threshold determination module 402.

In an embodiment, the MsP field 413 is a 3-bit field that can have a value of 0-7. Initially, when a new entry for a branch is created in the BCT 401, the MsP field is assigned a maximum value of 7. The U bits field 414 is a 3-bit field that is indicative of how often a branch instruction is executed, i.e., the usefulness of a branch. Usefulness tracking enables efficient use of space in a BCT table by identifying dormant branch instruction entries that are used infrequently and which may be replaced (i.e., have minimal operational usefulness). Finally, the BT field 415 is a 1-bit field that is assigned a value 1 for an HTP branch and a value 0 for a simple branch. In an embodiment, each new entry corresponding to a new branch instruction (that does not already have an entry in the BCT) is initially assigned a 0 value in the BT field, which may then be updated based on the methods discussed below. In other words, each new branch is assumed to be a simple branch.

As shown in FIG. 4, BCU 418 also includes a threshold determination module 402 that includes a 13-bit instruction counter field 421, a 10-bit misprediction counter field 422, a 10-bit stream counter field 423, a 5-bit reset CP counter field 424, and a stream threshold field 425. The stream threshold field 425 may be a floating point register whose size may be chosen based on the granularity required for the process of determining the threshold. In an example embodiment, the stream threshold register 425 may be a 32 bit register. The various counters included in the threshold determination module 402 are typically implemented as a binary saturating counter. For example, if a 10-bit saturating counter is used, the possible values of the counter are [0, 1, 2 . . . 1024]. The output of the counter can be used to decide the course of action. In an embodiment, the instruction count field 421 records the number of instructions received by the instruction fetch unit of the processor and is reset after $2^{13}$ instructions are received, the misprediction counter field 422 records the number of mispredictions by the branch predictor of the processor (i.e., when the actual behavior of a branch instruction does not match its predicted behavior), and the stream counter field 423 records the number of branch instructions that are identified as HTP by the BCT. In an embodiment, the reset CP counter field 424 records the current CP counter value and provides it to the BCT 401, and the threshold field 425 records the current threshold which is determined based on the workload of the processor (as discussed above).

Figure 5:
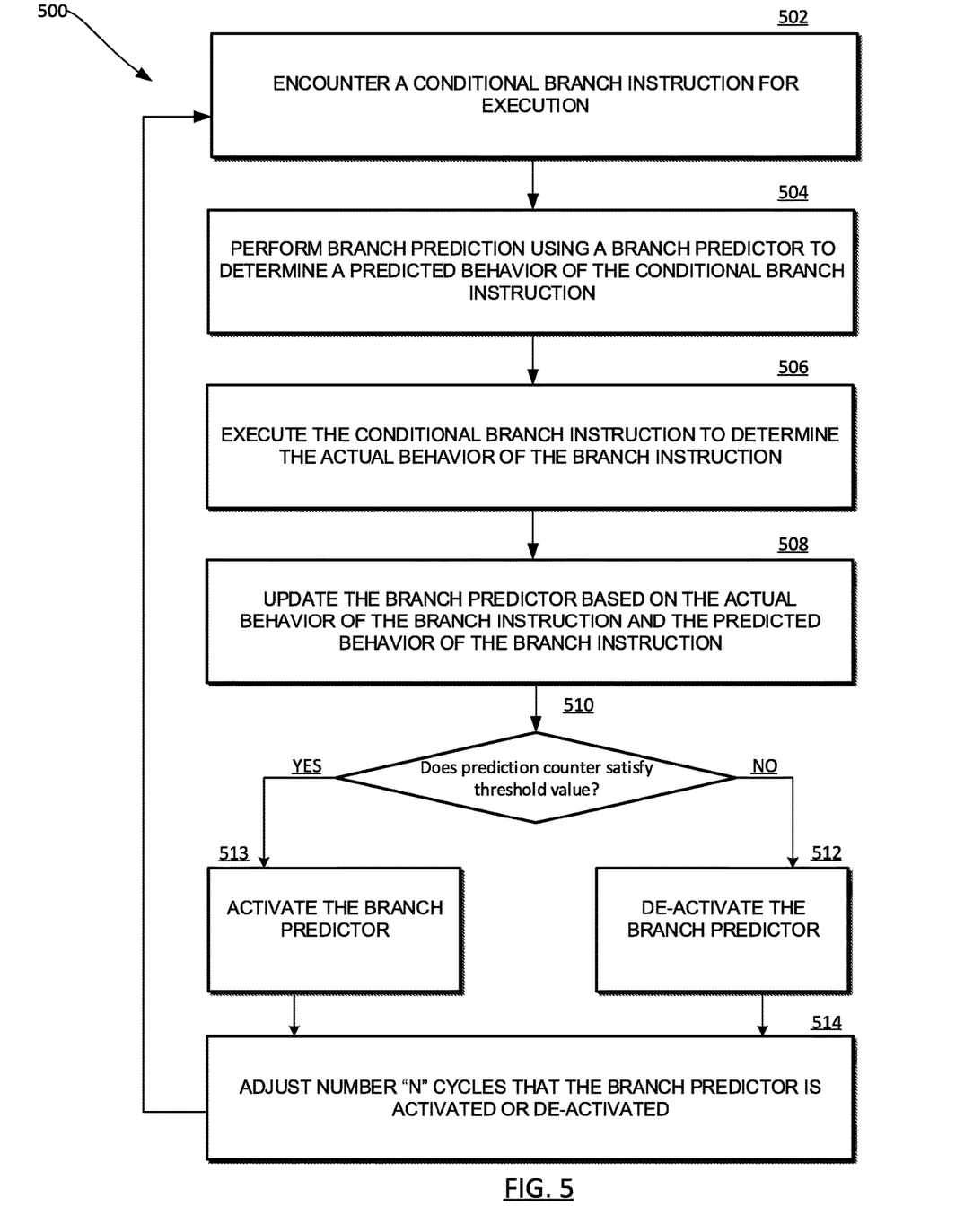
FIG. 5 illustrates an example flowchart describing a method for workload based branch predictor activity management, in accordance with an embodiment.

FIG. 5 illustrates an exemplary flowchart in accordance with one embodiment describing a method for activating and/or deactivating a branch predictor based on processor workload, applications of the processor, overall branch behavior, and/or other factors. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, or the steps may be performed in the order disclosed or in an alternate order.

While the illustrative embodiments described above are preferably implemented in hardware, such as in functional units of a processor, various aspects of the illustrative embodiments may be implemented in software as well. For example, it will be understood that each block of the flowchart illustration in FIG. 5, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

At 502, the instruction fetch unit may encounter a conditional branch instruction for execution and may transfer it to the branch predictor for prediction and classification. At 504, the system may perform branch prediction to determine a predicted behavior of the branch instruction. In some embodiments, the branch predictor may have been initially de-activated, or placed in sleep-mode. In such a scenario, the branch predictor may be awakened and used to determine a predicted behavior of the branch instruction.

At 506, the branch instruction may be executed to determine the actual behavior of the branch instruction. Upon execution of the branch instruction, at 508, the prediction decision counter 219 of the branch predictor may be updated based on the predicted and actual behavior of the branch instruction. For updating the prediction decision counter 219, if the predicted behavior of the branch matches the actual behavior (i.e., if the prediction for the branch instruction was taken and the branch was actually taken, or if the prediction for the branch instruction was not-taken and the branch was actually not-taken), the prediction decision counter 219 is incremented by 1. If the predicted behavior of the branch does not match the actual behavior (i.e., was a misprediction) because prediction for the branch instruction was taken and the branch was actually not-taken, or if the prediction for the branch instruction was not-taken and the branch was actually taken), the prediction decision counter 219 is decremented by 1.

At 510, the system may determine periodically whether the value of the prediction decision counter 219 satisfies a predetermined value (for example an absolute value threshold) and thus should be activated and used to predict branch instructions or de-activated and not used to predict branch instructions. The period may be set by number of processor cycles or number of branch instructions processed by the branch predictor. After this period, the prediction decision counter 219 is sampled. If the value of the prediction decision counter 219 does not satisfy the predetermined value, e.g., threshold value, the branch predictor is de-activated (e.g, put to sleep for N cycles and then activated to perform steps 502-508) as illustrated at 512. However, if the value of the prediction decision counter 219 satisfies the predetermined value, e.g., threshold value, the system may activate the branch predictor 208, as illustrated at 513. More specifically, when the prediction decision counter 219 satisfies the predetermined value (e.g., a threshold) by being incremented to or beyond the threshold value, then the branch predictor 208 may be activated and used to generate branch predictions that are executed by the processor for N number of cycles. When the prediction decision counter 219 satisfies a threshold by being decremented to or below the threshold value, then the branch predictor 208 may be de-activated and therefore not used to generate branch predictions for N number of cycles.

At 514, the N number of cycles for which the branch predictor 208 is activated and used to predict branch instructions or deactivated and not used to predict branch instructions may be adjusted. If consecutive sampling cycles confirm that the prediction decision counter 219 doesn't cross the threshold meaning that the branch predictor 208 is sufficiently wrong, the value of N is incremented by any step function. For example, assume N may be increased (starting at 64) in the following matter: N={64, 128, 256, 384}. Thus, for the first consecutive sampling cycle confirming that the branch predictor 208 is sufficiently wrong, N would transition from 64 to 128. For the next consecutive sampling cycle confirming that the branch predictor 208 is sufficiently wrong, N would transition from 128 to 256, and so on. At the point that the sampling cycle confirms that the branch predictor 208 is not sufficiently wrong, the sampling cycle is not considered consecutive with the previous confirmation, and thus, in an embodiment N returns to the lowest step of the function (in the above example, 64).

Similarly, if consecutive sampling cycles confirm that the prediction decision counter 219 crosses the threshold meaning that the branch predictor 208 is sufficiently correct, the value of N is incremented by any step function. For example, assume N may be increased (starting at 64) in the following matter: N={64, 128, 256, 384}. Thus, for the first consecutive sampling cycle confirming that the branch predictor 208 is sufficiently correct, N would transition from 64 to 128. For the next consecutive sampling cycle confirming that the branch predictor 208 is correct, N would transition from 128 to 256, and so on. At the point that the sampling cycle confirms that the branch predictor 208 is not sufficiently correct, the sampling cycle is not considered consecutive with the previous confirmation, and thus, in an embodiment N returns to the lowest step of the function (in the above example, 64).

As such, the branch prediction counter may be used to control the accuracy of the predictions performed by the branch predictor 208. Since the threshold value is dependent upon various factors relating to the workload of the processor, the aggressiveness and/or accuracy of the branch predictor 208 may be configured based on the workload of the processor.

In an exemplary embodiment, where the branch predictor 208 is implemented in hardware, the methods described herein, such as process 500 of FIG. 5 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor comprising:
a processor pipeline comprising one or more execution units configured to execute a plurality of branch instructions;
a branch predictor associated with the processor pipeline and configured to predict branch instruction outcomes of the plurality of branch instructions, wherein the branch predictor predicts a branch instruction prediction outcome for each branch instruction of the plurality of branch instructions, and determines when to execute the branch instruction prediction outcome by:
   incrementing a prediction decision counter in response to an actual execution of a respective branch instruction being the same as the branch instruction prediction outcome of the respective branch instruction; and
   decrementing the prediction decision counter in response to the actual execution of the respective branch instruction not being the same as the branch instruction prediction outcome of the respective branch instruction,
wherein, based on the prediction decision counter, the branch predictor is either:
   activated and the branch instruction prediction outcome is executed for a number of cycles of the processor or for a number of branch instructions, or
   deactivated so that the branch predictor is not operational and does not generate branch instruction prediction outcomes for the number of cycles of the processor or the number of branch instructions;
a branch classification table having circuitry and logic to determine and track a branch type for each branch instruction, the branch classification table having a branch tag field to identify each branch instruction, a correct prediction (CP) counter field that is assigned a value determined by a threshold determination module, a usefulness field that indicates how often the branch instruction is executed, and a branch type field indicating whether the branch instruction is a hard to predict (HTP) branch instruction or a simple branch instruction; and
the threshold determination module having circuitry and logic comprising: a mis-prediction counter that records the number of mis-predictions by the branch predictor; a stream counter field that records the number of branch instructions identified as HTP branches in the branch classification table; a reset correct prediction (CP) counter field that records a current correct prediction (CP) counter value; and a threshold field that contains an activation threshold value based upon a workload of the processor,
wherein the threshold determination module is configured to:
   dynamically determine the activation threshold value for different processor workloads, and
   supply the current correct prediction (CP) counter value to the branch classification table in response to a new entry being created in the branch classification table.

2. The processor of claim 1, wherein to activate the branch predictor and execute the branch instruction prediction outcome comprises:
comparing the prediction decision counter to an activation threshold; and
activating the branch predictor and executing the branch instruction prediction outcome for the number of cycles of the processor or the number of branch instructions in response to the prediction decision counter being incremented to or above the activation threshold.

3. The processor of claim 2, wherein the branch predictor is further configured to:
increase, in response to the activation threshold being satisfied at least one more consecutive time, the number of cycles of the processor or the number of branch instructions that the branch predictor is activated and the branch instruction prediction outcome is executed.

4. The processor of claim 1, wherein to deactivate the branch predictor so that the branch predictor is not operational and does not generate branch instruction prediction outcomes comprises:
comparing the prediction decision counter to an activation threshold; and
deactivating the branch predictor so that the branch predictor is not operational and does not generate branch instruction prediction outcomes for the number of cycles of the processor or the number of branch instructions in response to the prediction decision counter being decremented to or below the activation threshold.

5. The processor of claim 4, wherein the branch predictor is further configured to:
increase, in response to the activation threshold not being satisfied at least one more consecutive time, the number of cycles of the processor or the number of branch instructions that the branch predictor is not activated where the branch predictor is not operational and does not generate branch instruction prediction outcomes.

* * * * *